United States Patent
Singarayar et al.

(10) Patent No.: US 12,455,782 B2
(45) Date of Patent: Oct. 28, 2025

(54) FAILURE TRACKING WITH REAL-TIME DATA EVENT STREAMING FOR DATA QUALITY CHECKS

(71) Applicant: PAYPAL, INC., San Jose, CA (US)

(72) Inventors: Sathish Singarayar, Cupertino, CA (US); Prasenjit Karmakar, Hyderabad (IN); Punit Gora, Sikar (IN); Anurag Kumawat, Jaipur (IN); Ramya Arumugam, Chennai (IN)

(73) Assignee: PAYPAL, INC., San Jose, CA (US)

( * ) Notice: Subject to any disclaimer, the term of this patent is extended or adjusted under 35 U.S.C. 154(b) by 14 days.

(21) Appl. No.: 18/393,310

(22) Filed: Dec. 21, 2023

(65) Prior Publication Data
US 2025/0208942 A1    Jun. 26, 2025

(51) Int. Cl.
*G06F 11/00* (2006.01)
*G06F 11/07* (2006.01)

(52) U.S. Cl.
CPC ...... *G06F 11/0787* (2013.01); *G06F 11/0721* (2013.01)

(58) Field of Classification Search
CPC ... G06F 11/0787; G06F 11/14; G06F 11/1402
See application file for complete search history.

(56) References Cited

U.S. PATENT DOCUMENTS

| | | | |
|---|---|---|---|
| 11,929,869 B2* | 3/2024 | Gonigberg | G06F 9/4411 |
| 12,147,292 B1* | 11/2024 | Padmanaban Anand | |
| | | | G06F 11/0766 |
| 2014/0380105 A1* | 12/2014 | Michel | G06F 11/0769 |
| | | | 714/57 |
| 2015/0347243 A1* | 12/2015 | Guerin | G06F 15/17331 |
| | | | 709/212 |
| 2017/0083396 A1* | 3/2017 | Bishop | G06F 11/14 |
| 2020/0089673 A1* | 3/2020 | Imai | G06F 9/542 |
| 2020/0183951 A1* | 6/2020 | Mittal | G06F 16/2237 |
| 2022/0382620 A1* | 12/2022 | Bramble | G06F 11/0787 |

* cited by examiner

*Primary Examiner* — Philip Guyton
(74) *Attorney, Agent, or Firm* — Haynes and Boone, LLP

(57) ABSTRACT

Accuracy and speed improvements for data computing results are provided herein, particularly in the context of data event streaming services and downstream data computing processes. There are provided systems and methods for failure tracking with real-time data event streaming for data quality checks. A service provider may utilize different computing services for event processing and storing for downstream applications and services in a production computing environment. Due to issues in data loading and/or processing, certain events when streamed may fail to be processed and/or stored for availability to further system components. A failed event tracker may be implemented where, when events fail to process in an original processing queue, the tracker may detect the failure and write an identifier for the event to a table in an accessible database. The tracker may the republish the event via a retry processing queue using the identifier and may track for completion.

18 Claims, 6 Drawing Sheets

FAILURE TRACKING WITH REAL-TIME DATA EVENT STREAMING FOR DATA QUALITY CHECKS

TECHNICAL FIELD

The present application generally relates to real-time data event streaming and processing, and more particularly to tracking failures to process real-time data events when streamed for use by downstream applications and services.

BACKGROUND

Users may utilize online service providers and corresponding computing systems and services to perform various computing operations and view available data. Generally, such computing operations are provided by online platforms and systems, which may provide applications and services for account establishment and access, messaging and communications, electronic transaction processing, and other types of available services. During performance of these operations, the service provider may utilize one or more applications to process data, which may include real-time data that is streamed to various data consumers. However, processing of real-time data streams and streamed events in a production computing environment may fail or timeout, which leads to inaccurate and/or failed delivery of downstream data to users and entities, resulting in failed, inaccurate, or unreliable computing services. As such, there exists a need for more reliable and faster failure tracking to determine when all streamed data events have been processed and resolved to neutralize effects from late or incomplete data processing after processing failures.

Figure 1:
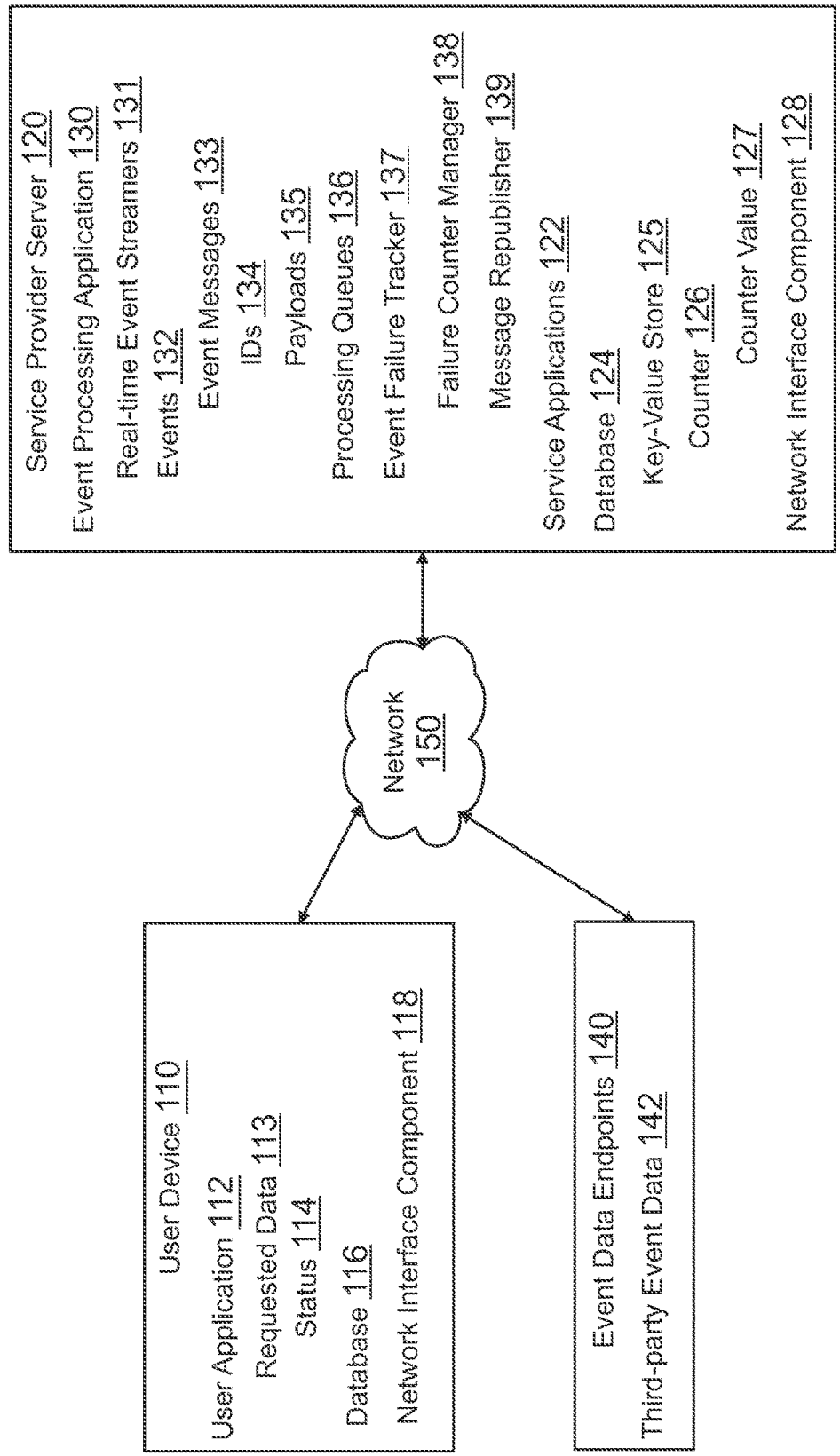
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for failure tracking with real-time data event streaming for data quality checks. Systems suitable for practicing methods of the present disclosure are also provided.

Service providers may receive, handle, and process streaming real-time data in order to provide information and computing services to users. Such data may arrive over various types of data streaming components and/or systems, and may arrive at one or more applications, computing services, data lakes, or the like. In conventional systems, the data may be processed, and downstream computing services, data reporting or informational resources, applications, account portals, interfaces, and/or other endpoints may receive the data for further processing and/or output to users. Generally, this data may be visible and reliable once processed, and therefore users may view and rely on such data, and the service provider or other entities may utilize the data when providing further services to the data's recipient or other associated entity.

However, failures in data delivery, receipt, loading, and/or processing of event data when streamed may cause certain data to not be reported, recorded, and/or provided to the downstream service or endpoint. In some situations, computing services handling streaming data may fail or timeout due to data processing errors, computing attacks, and other events. For example, data processing failure may occur due to processing node timeout, application programming interface (API) failures or unresponsive calls, failures to receive and/or load events due to the transmitting or receiving endpoint, data processing or run-time errors, fraud or computing attacks that compromise the computing systems, or when other failure conditions occur. When failure occurs, downstream data services may be inaccurate when reporting and/or processing data and users, customers, and/or the service provider may be adversely affected. For example, a merchant customer's balance from transaction processing of an electronic transaction may show an incorrect amount, which may adversely affect risk decisioning by intelligent risk systems and access to computing services by the merchant. As such, inaccurate and/or unreliable data may cause loss and may affect performance of corresponding systems and/or intelligent decision-making by automated systems.

As another example, a downstream data service may experience failures due to inaccurate and/or incomplete data when a series of events (such as transactions) have not all been successfully processed. Consider a scenario in which transaction events are continually processed throughout the day, and at midnight, a batch process is run to perform further calculations on all the transaction events for that day. If the batch process is commenced at 12:00:01 A.M. (one second after midnight), then a transaction event which began at 11:59:59 P.M. which may cause. If the accuracy of a downstream data service relies on all transaction events having been fully processed by a data streaming service, commencing the batch process at 12:00:01 A.M. (one second after midnight) may cause the batch process to fail and/or be inaccurate, as the transaction event from 11:59:59 P.M. may not have fully completed.

One solution would thus be to wait some specified amount of time (e.g. 1 hour) after a time period having streaming events has completed before attempting to execute a downstream data process. But this solution has at least two significant drawbacks. First, a system failure or other issue (e.g. network outage) might occur such that even after waiting 1 hour, not all transaction events from the prior time period will have been fully processed by a data streaming component. Second, it could be the case that waiting 1 hour is unnecessarily long. E.g., in the case that all streaming events were processed within 2 minutes of the time period ending, using a 1 hour delay would introduce an unnecessary 58 minutes of delay for the batch process. As discussed further herein, Applicant's solutions avoid these drawbacks, and accordingly improve the functioning of computer systems at least by (1) providing greater data processing accuracy (i.e. correctness of computing results) and (2) removing unnecessary data processing delays (i.e. faster computing results).

Thus, in various embodiments, the service provider may provide an event failure tracker for an event streaming framework that may facilitate tracking of failures to process a real-time event or other streamed event data, and further determine when processing of the event and other failures have been completed to accurately track whether data has been processed and is accurately reported. This allows for the framework to neutralize or prevent the adverse effects of late arriving and/or processed data from causing the data resulting from streamed and/or processed events from being inaccurate or unreliable. Events may have a corresponding message with data or a payload, and may be identified by their message or event identifiers (IDs) in different processing queues. In this regard, the tracker may detect a failure to process and event, and may store an event or message ID from an event message having event data (e.g., a payload) that failed to process. When the event ID is stored, such as to a cache or database for a key-value database, data store, or the like, a counter may be incrementally increased by a set amount, such as 1. The event message and/or data may be republished in a different queue that may be used for processing the event data after failure, where republishing may use the same event ID to track processing completion. On detection of completion of a processing task or operation associated with the event message or payload and the event ID, the tracker may then decrease the counter incrementally by the same amount, such as 1. Thus, when the counter returns to an original state, such as 0, the tracker and event streaming framework may identify that all failures have been resolved, and thus the real-time streamed data has been successfully processed.

In this regard, a service provider, such as an online transaction processor, may provide computing services to users and/or their corresponding entities, which may include end users and customers, merchant customers for an online transaction processor, businesses and their representatives and/or employees, and the like. In order for users to utilize computing service of a service provider, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services and provide assistance to users with these payment instruments and/or payment processing. In some embodiments, the account creation may establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services.

Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. Similarly, the merchants may use the accounts when providing their merchant services to customers, such as during electronic transaction processing. Different online use of accounts and/or computing services of the service provider may therefore correspond to requests, activities, and/or interactions for one or more events that occur and may be processed by the computing applications, platforms, and/or systems of the service provider, such as by using a networked, server-based, and/or cloud computing infrastructure and service.

Events may have corresponding data generated from devices, sensors, and servers that receive, detect, and/or generate event data from the corresponding requests, activities, and/or interactions by the users, merchants, or the like. For example, an event may correspond to a business event taken by a merchant or a user, such as processing a transaction or payment, performing a profile update of an account, sending a message or content, and the like. Events, when streamed to processors of the service provider for handling, may be streamed to a data processing queue, where the service provider may utilize multiple queues to handle different events, processing loads, streams, and the like.

Event data may be collected and/or received and may be streamed via one or more data streamers, components, and/or cloud-based streaming service to one or more endpoints for processing. These endpoints may correspond to specific devices, data repositories, or the like that process and store the data, as well as serve the data to downstream applications, devices, and/or services, as well as cloud-based data lakes that may operate on large volumes of data so that the data can be reported and/or handled by downstream services. As such, when real-time streamed events arrive at a gateway, orchestration layer, further service, or other endpoint that processes the data for provision to the user, merchant, or the like, the events may be processed for further handling and/or storage. These processing jobs and/or tasks may fail, as discussed herein, and as such, the service provider may implement an event failure tracker and/or framework for an event processing system and pipeline to provide further redundancy and reliability of data processing and reporting for users and downstream services. This may further provide increased accuracy and faster results by tracking when failures have been resolved to quickly report accurate and complete data.

The event failure tracker may correspond to a daemon, software component, application, or the like, which may be executed by corresponding hardware, servers, cloud computes or cloud-based machines, and the like, that may monitor for data processing failures of events and/or event requests. Events may be associated with an event message or other event data package, which may include an event or message ID and a corresponding event or message payload to be processed. In this regard, when a failure is detected by the event failure tracker in a first data processing queue, the event failure tracker may identify the failed event and corresponding event message. The event failure tracker may then store the event ID in a failed event cache or other storage with a database of and/or accessible to the service provider. In some embodiments, the cache may correspond to a local and/or short-term storage with a key-value database of the service provider, and the event ID may be written to a data table of event IDs for failed events. When writing the event ID to the table, a handshake may be performed with the database by the event failure tracker so that communications may be exchanged, and writing/updating operations performed to the table by the tracker. This allows for database lookups, as well as writing to and/or updating values and data in the table (e.g., status updates for event failure resolution).

A bucket or table in the cache or other storage may be incrementally increased by a corresponding value (e.g., 1) to account for the failure. The message for the event may be republished or a new message published to a second data processing queue, such as a retry queue. When republishing or publishing the new message, the message may include the event ID or other message ID, payload, and/or other content. However, headers or other message fields may change as needed when being published in the second data processing or retry queue. This allows for the event to be reprocessed and/or retried for completion of processing. The event failure tracker may then implement a process to monitor, such as by periodically scanning and/or executing an iterative and/or repeated process (e.g., at certain time intervals and/or over a period of time) that scans the database having the stored table for event IDs having failures for event processing. This may be done with multiple failures such that the counter may increase incrementally for each failure, and thereafter decrease by a similar incremental amount when failures have been resolved or completed (e.g., an event is successfully processed or otherwise resolved including by deletion/removal).

The second, or further subsequent, data processing queue may then attempt to process the event based on wait time, resources, queue length and/or place, and the like. When the event is detected as being resolved, such as if a successful processing value or indication is written to the table in the database for the event ID, the event failure tracker may determine the event is resolved and/or stored/completed, and thus, processing has completed. The tracker may scan the table in the database to perform a lookup, such as based on the previously established handshake, and detect the value for successful completion or resolution has been recorded. The tracker may then decrease the stored counter value by the same incremental amount that caused the increase to the counter. The tracker may continue to monitor failures until the tracker again reaches zero or value at another initial state or minimum so that it may be determined that all failed events have been resolved. Thereafter, when the failed events have been identified as resolved, the service provider may provide more reliable data that is less likely to change or be inaccurate due to system rollbacks or errors.

In this manner, a service provider may provide automated and efficient tracking of data processing failures when streaming real-time events and other data. This may allow for faster, more accurate, and more coordinated data provision and processing by system components, devices, and the like, which may prevent or deter computing attacks and abuse, system errors, and the like. This may better assist merchants and other entities requiring reliable and fast data so that actionable activities may be performed in a timely and reliable manner. Thus, the service provider may provide more efficient and faster usage of data by downstream services and ensuring such data is accurate and reliably processed.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a user device 110, a service provider server 120, and event data endpoints 140 in communication over a network 150. User device 110 may be utilized by a merchant or other user to access a computing service or resource provided by service provider server 120, where service provider server 120 may provide various data, operations, and other functions to user device 110 via network 150. As such, user device 110 may be used to establish an account with service provider server 120, which may be used for electronic transaction processing of items with customers of the merchant, as well as interaction with and usage of services of service provider server 120. Service provider server 120 may process real-time and/or live stream events and determine if any failures to record, process, and/or post the data occurs. If so, an event failure tracker may be implemented that uses an incremental counter in a database to track failures and resolution of such failures, where one or more monitoring and/or iterative processing jobs may be executed to scan a table of the database of successful completion statuses of event IDs having been added for the failures.

User device 110, service provider server 120, and event data endpoints 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 120, event data endpoints 140, and/or other devices or servers. User device 110 may be maintained, for example, by a merchant or other entity that provides items for sale to users. User device 110 may correspond to one or more physical and/or online merchant marketplaces, sales platforms, point-of-sale (POS) devices, websites, and/or online resources where a user may visit in order to shop for items. For example, user device 110 may correspond to one or more POS devices at physical merchant locations to process transactions, as well as websites and/or applications accessible digital platforms, where customers may be offered products, services, and other items for sale and users may browse items, select items for purchase, and engage in electronic transaction processing.

User device 110 may further include, correspond to, and/or provide other platforms, websites, and resources that may allow users to engage in electronic transaction processing, such as those associated with payment processors, transfers of funds, payment of utilities or living expenses, and other payments or purchases that may be used by users and may require payment of a balance due for some product, service, or other item. In some embodiments, user device 110 may be implemented as a single or networked personal computers (PCs), servers, a smart phone, laptop computer, wearable computing device, and/or other types of computing devices. Although only one merchant device is shown, a plurality of merchant devices may function similarly. Further, although system 100 described user device 110 as being a device of a merchant, merchant device may also be a device of an end user, customer, or the like that may also request and receive data from service provider server 120 based on event processing.

User device 110 of FIG. 1 contains a user application 112, a database 116, and a network interface component 118. User application 112 may correspond to executable processes, procedures, and/or applications with associated hardware. In other embodiments, user device 110 may include additional or different modules having specialized hardware and/or software as required.

User application 112 may provide and/or process items for sale with client devices and/or customers or other users associated (e.g., based on payment sources including a payment card, digital account, cash, etc.). User application 112 may be accessible over the Internet and provide for sales with client devices over network 150. User application 112 may also correspond to a checkout application at a physical merchant location, such as the application(s) of a point-of-sale (POS) device used to provide sales at physical locations. User application 112 may be used to establish a transaction once a merchant/employee associated with user device 120 has entered one or more items for purchase and/or entered the item(s) to the transaction for processing. Once a payment amount is determined for the item(s) to be purchased, user device 120 may request payment for the transaction. Payment may be provided using a digital account, where transaction processing events and results may be processed and handled by service provider server 120. In this regard, payment may be received from a digital account and different transactions and payments may correspond to real-time events streamed and processed by service provider server 120. After payment processing, user application 112 may be used to provide a receipt and/or view payment results or a transaction history. As such, user application 112 may be used to provide and/or request processing of event data, which may be handled by service provider server 120 including use of failure tracking components and operations to ensure data reliability. Thus, when requested data 113 is provided to user application 112 based on event data processing, such as an account balance, transaction result, or the like, more reliable data may be seen and/or a status 114 of event data processing and whether failed processing of events are pending resolution may be seen.

User application 112 may correspond to a general browser application configured to retrieve, present, and communicate information over the Internet (e.g., utilize resources on the World Wide Web) or a private network. For example, user application 112 may provide a web browser, which may send and receive information over network 150, including retrieving website information, presenting the website information to the user, and/or communicating information to the website. However, in other examples, user application 112 may include a dedicated application of service provider server 120 or other entity. Different services may be provided via user application 112, including social networking, media posting or sharing, microblogging, data browsing and searching, online shopping, and other services available through service provider server 120. Thus, user application 112 may also correspond to different service applications and the like.

When utilizing user application 112 with service provider server 120, user application 112 may request processing of a data processing request, and further user application 112 may be used to request and view requested data 113 from service provider server 120, which may include data from processing real-time events that are received, streamed, and/or handled by service provider server 120. As such, request data 113 provided by service provider server 120 may include data that is provided after handling event processing failures, as discussed herein, and may further be provided with status 114 and/or other updates on data processing when failures occur. Although merchant data is discussed and described herein as corresponding to requested data 113, any type of data may be requested and provided to user device 110 from service provider server 120 for other users and/or entities, which may be based on processing real-time events and event streams, such as customer data, account data for an account of a user, financial or banking data, electronic communications, news streams, and the like.

User device 110 includes other applications as may be desired to provide features to user device 110. For example, these other applications may include security applications for implementing client-side security features, programmatic client applications for interfacing with appropriate application programming interfaces (APIs) over network 150, or other types of applications. Other applications on user device 110 may also include email, texting, voice and IM applications that allow a user to send and receive emails, calls, texts, and other notifications through network 150. In various embodiments, the other applications may include financial applications, such as banking applications. Other applications may include social networking applications, media viewing, and/or other merchant or user available applications.

The other applications may also include other location detection applications, which may be used to determine a location for the user, such as a mapping, compass, and/or GPS application, which can include a specialized GPS receiver that determines location information for user device 110. The other applications may include device interface applications and other display modules that may receive input from the user and/or output information to the user. For example, user device 110 may contain software programs, executable by a processor, including a graphical user interface (GUI) configured to provide an interface to the user. The other applications may therefore use devices of user device 110, such as display devices capable of displaying information to users and other output devices, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with user application 112 and/or other applications 114, identifiers associated with hardware of user device 110, or other appropriate identifiers, such as identifiers used for payment/user/device authentication or identification, which may be communicated as identifying the user/user device 110 to service provider server 120.

User device 110 includes at least one network interface component 118 adapted to communicate with service provider server 120, event data endpoints 140, and/or another device or server. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize and/or provide event data from real-time event data processing. In this regard, service provider server 120 includes one or more processing applications which may be configured to interact with user device 110, for example, to provide requested data 113 from one or more events that were processes, stored, and/or made available for user device 110 and/or other devices, servers, and/or components for data processing and/or data review. In one example, service provider server 120 may be provided by PAYPAL®, Inc. of San Jose, CA, USA. However, service provider server 120 may be maintained by or include another type of service provider.

Service provider server 120 of FIG. 1 includes an event processing application 130, service applications 122, a database 126, and a network interface component 128. Event processing application 130 and service applications 122 may correspond to executable processes, procedures, and/or applications with associated hardware. In other embodiments, service provider server 120 may include additional or different modules having specialized hardware and/or software as required.

Event processing application 130 may correspond to a digital platform, software application and/or application architecture, or the like that may include one or more processes that execute modules and associated specialized hardware of service provider server 120 to receive incoming and/or streaming data, such as in real-time and/or from previous data stored and/or aggregated in a database, cache, cloud storage, or other data storage, and process such data. In this regard, service applications 122 may correspond to specialized hardware and/or software that may utilize and/or access data from real-time event streamers 131, which may be used to receive event data for events 132 and process such data so that it is available to downstream systems, components, applications, and/or databases. In other embodiments, event data may be batched and not streamed in real-time, and may therefore be handled and processed after being stored and/or aggregated in a cache, database, or the like after receipt for processing. As such, event 132, once processed, may be used to provide computing services to users and entities, such as a merchant via user device 110. Such services may be associated with electronic transaction processing (e.g., transaction results, account balance, daily account updates or opening/closing balances, etc.), messaging, accounts, and the like.

In this regard, event processing application 130 may make data from processing events 132 available to service applications 122 during use of such applications and computing services by users and entities. However, during processing of or when attempting to process events 132, a failure may occur such that one or more of events 132 may fail to process. For example, real-time event streamers 131 may not receive all or part of a data load for an event, may fail to properly stream the event or receive corrupted data, a processing component may fail or timeout, and the like. These failures result in failure of data processing and completion of requests for data that may be requested from devices and servers, such as user device 110, leading to inaccurate or incomplete data being provided. This data may therefore be unreliable and may not properly reflect all event data required to be processed to provide a complete data record and/or result to a user, entity, or the like (e.g., the merchant of user device 110). This may also adversely affect other systems, such as risk decisioning and the like, which may result in loss (e.g., processing a fraudulent transaction). As such, event processing application 130 may implement and utilize operations, components, and data structures for identifying data processing failures with events 132 and utilize an event failure tracker 137 to track failures of events and when retries for processing those failed events have been successful and data processing for a set of events is complete.

In this regard, each of events 132 may have a corresponding one of event messages 133, such as an event data package, container, or object, which may include IDs 134 and payloads 135. Events 132 in computing and processing may correspond to an action or occurrence designated to be handled by service provider server 120 and recognized by a software application as triggering or causing a processing flow for resolution, such as processing of data to provide a result, update a data record, or the like. Events 132 may have a set of events that are used to provide requested data 113 once processed, such as by providing an output in application 112 using requested data 113, where a corresponding status 114 may show a current processing status and whether failed events have not yet been processed and requested data 113 may not be considered as "complete" or "reliable" while events that failed to process are retried. The set of events may be associated with a data record to be created and/or updated based on processing the events, such as a transaction history and/or balance for a user or merchants. The set of events monitored to completion may further be associated with a particular data request, such as requested data 113, such that completion of processing for all of the events in the set may designate when the corresponding data record(s) or the like for requested data 113 may be identified as completed or reliable.

Events 132 may be handled and processed from processing queues 136, where real-time event streamers 131 may stream event data for events 132 (e.g., event messages 133 and other event data for processing including third-party event data 142 from event data endpoints 140) to processing queues 136. Processing queues 136 may have different queues to handle different events, such as for different activities, downstream data endpoints, requests, or the like. Further, processing queues 136 may include a retry queue, where failed events from events 132 may be retried for processing after their corresponding ones of IDs 134 and payloads 135 are republished in the retry queue and/or event messages 133 are published or republished with the same or similar message content (e.g., IDs 134 and/or payloads 135), but with different message headers for the retry queue. As such, the retry queue may handle payloads 135 for reprocessing and handling of failed event processing, where IDs 134 may be used to track processing of those failed events from failure to process one or more of event messages 133.

As such, when one of events 132 fails to process in a first or initial new event handler and/or processing queue of processing queues 136, event failure tracker 137 may be invoked. Event failure tracker 137 may correspond to a software daemon or other executable application or process, which may run automatically and/or in a background computing environment, that detects the failure to process the one of events 132. In this regard, the software daemon or other software application, operation, or component may run or execute with processing queues 136 to monitor outputs and/or detect failures of data processing.

Event failure tracker 137 may store a corresponding one of IDs 134 to database 124, such as with a key-value store 125 or other data storage. Storage of ones of IDs 134 for failed events in key-value store 125 may be to a data table having rows for each failed event, where columns may include those for IDs 134, when the corresponding ones of events 132 failed and/or were written to the table, a last status or activity, a payload or payload hash/ID, one of processing queues 136 used, and/or other identifying data, as well as a resolution or successful processing timestamp and/or identification.

Event failure tracker 137 may further include a failure counter manager 138, which may then incrementally increase a counter 126 accompanying the storage of the one of IDs 134 in key-value store 125 of database 124. Increasing incrementally may correspond to increasing by 1 for each failed event and decreasing by 1 for each one of the failed events that is detected as being successfully completed or processed in the retry queue of processing queues 136; however, other set values may also be used, such as depending on the event, established by an administrator, or the like. As such, counter 126 may have a counter value 127 that increases and decreases as failed events are added to the retry queue and/or successfully processed from the retry queue. Once added, the one of IDs 134 in the data table is monitored, tracked, or used for successful retry of event processing. For example, a successful processing of an event from the retry queue may be used to look up a corresponding on of IDs 134 in the data table and determine that the event has been completed and may be marked as such in the table, with a corresponding decrease of counter value 127 by the set value incrementally for the success. Thus, when counter 126 reaches zero or other initial starting point, all failed events may be determined to have been completed and successful from the retry queue, and a corresponding data request, record, or the like (e.g., data for requested data 113) may be completed and reliably provided as a full data record and/or report. The operations and components used to track event processing failures using event failure tracker 137, are described in further detail below with regard to FIGS. 2-4.

Service applications 122 may correspond to one or more processes to execute modules and associated specialized hardware of service provider server 120 to provide computing services for account usage, digital electronic communications, electronic transaction processing, and the like. In this regard, service applications 122 may correspond to specialized hardware and/or software used by service provider server 120 to provide, such as to a merchant or other user associated with user device 110, one or more computing services. Service applications 122 may correspond to electronic transaction processing, account, messaging, social networking, media posting or sharing, microblogging, data browsing and searching, online shopping, and other services available through service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for use of the computing services of service applications 122.

The computing services may be accessed and/or used through a browser application and/or dedicated payment application executed by user device 110, such as user application 112 that displays UIs from service provider server 120. Such account services, account setup, authentication, electronic transaction processing, and other computing services of service applications 122 may utilize data and/or results of processing events 132, and therefore may load, serve, and/or operate on data from events 132 based on requests from user device 110. In some embodiments, such requests may correspond to requested data 113, which may be provided to user device 110 when processing events 132. In this regard, if processing of events 132 may fail, and therefore event processing application 130 may invoke event failure tracker 137 to handle retry and tracking of those failed events. Service applications 122 may receive information regarding failed events and may provide requested data 113 based on the processed and failed events including status 114 of reliability of data, failed processing of events, and/or retry success to user device 110.

Additionally, service provider server 120 includes database 124. Database 124 may store various identifiers associated with user device 110. Database 124 may also store account data, including payment instruments and authentication credentials, as well as transaction processing histories and data for processed transactions. Database 124 may store financial information and tokenization data. Database 124 may further include a key-value store 125, such as a database with a map or associative array that associates each "key" or identifier with a corresponding value or data, in a data structure (e.g., a table). As such, key-value store 125 may include a counter 126 and counter value 127 used to track those of IDs 134 written to a table of key-value store 125 when corresponding ones of events 132 fail to process and event messages 133, IDs 134, and/or payloads 135 are republished and/or published in a retry queue of processing queues 136 with new message headers or the like.

Service provider server 120 may include at least one network interface component 128 adapted to communicate user device 110, event data endpoints 140, and/or other devices and servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Event data endpoints 140 may correspond to one or more online websites, resources, devices, servers, Internet of Things (IoT) sensors), and the like that may be associated with third-party event data 142 processed by service provider server 120. One or more of event data endpoints 140 may be hosted, provided by, and/or utilized by a merchant, seller, or the like to advertise, market, sell, and/or provide items or services for sale, as well as provide checkout and payment. In this regard, event data endpoints 140 may be utilized by one or more merchants to provide websites and/or online portals for transaction processing and sales. For example, event data endpoints 140 may be used to host a website having one or more webpages that may be used by customers to browse items for sale and generate a transaction for one or more items. Event data endpoints 140 may provide a checkout process, which may be utilized to pay for a transaction.

Further, event data endpoints 140 may also correspond to devices and/or servers of other users and/or entities including customers and/or businesses that may interact with user device 110 for transaction processing. As such, third-party event data 142 may correspond to further event data that may be processed by service provider server 120, such as user and/or account data that may be processed during transaction event processing. Third-party event data 142 may therefore be provided to service provider server 120 during event data processing and streaming of event data for handling. Third-party event data 142 may fail to be processed, such as if there is an issue with a corresponding one of event data endpoints 140 when loading or transmitting third-party event data 142 or an issue with handling third-party event data 142 at service provider server 120. As such, failure tracking and handling of third-party event data 142 may be performed by service provider server 120, as discussed herein.

Network 150 may be implemented as a single network or a combination of multiple networks. For example, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
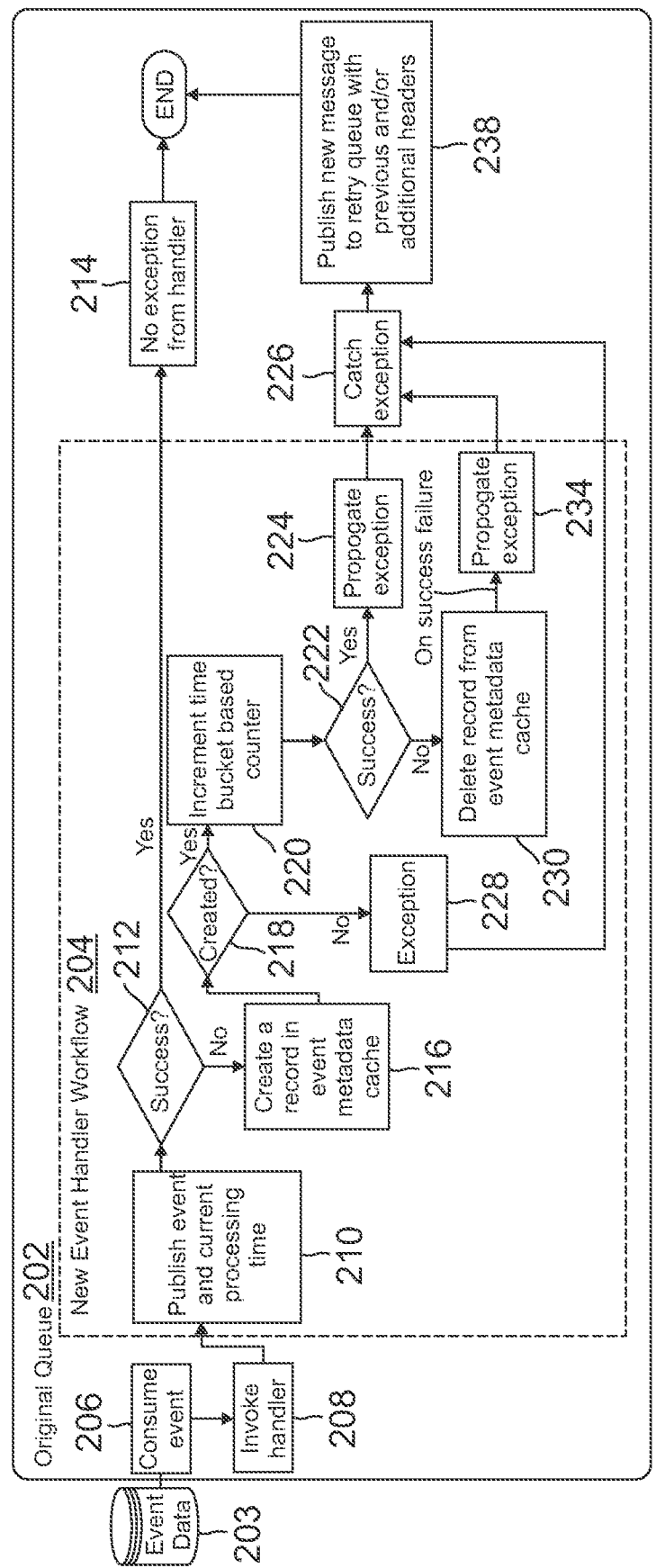
FIGS. 2A and 2B are exemplary system environments where events are streamed for processing and retry during failure, where event processing failures may be tracked for more reliable downstream data availability using an event failure tracker and counter, according to an embodiment.
Figure 2B:
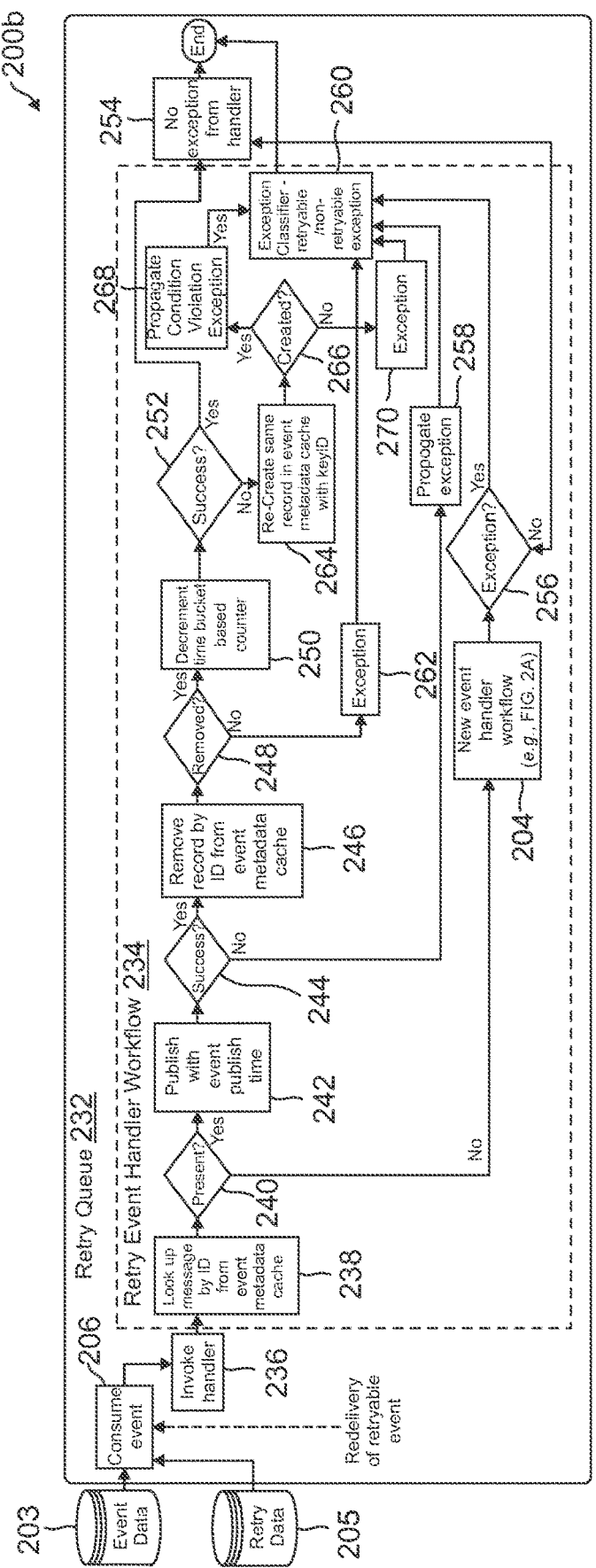

FIGS. 2A and 2B are exemplary system environments 200a and 200b where events are streamed for processing and retry during failure, where event processing failures may be tracked for more reliable downstream data availability using an event failure tracker and counter, according to an embodiment. System environment 200a of FIG. 2A includes an original queue 202 that may correspond to an event processing queue used to process events, such as one of processing queues 136 when processing events 132 from real-time event streamers 131 discussed in reference to system 100 of FIG. 1. In this regard, event data may include event messages 133 and/or other data corresponding to events 132, which may be processed by original queue 202 using a new event handler workflow 204 via a consume event operation 206.

In system environment 200a, event data 203 may correspond to an event stream and/or data lake where events are streamed to, or more generally may be any data storage components where events may be processed including databases where events from other queues and/or storages, such as when replicating events from one storage platform to another in order to store data with the other platform. For example, event data may correspond to a database or the like where business events from one platform (e.g., ActiveMQ or AMQ) are replayed for storage by another platform (e.g., a Google Cloud Platform such as BigQuery). As such, consume event operation 206 may, for each event pending processing, access the event's message or other data from event data 203 and perform an invoke handler operation 208 to invoke a new event handler executing new event handler workflow 204. New event handler workflow 204 may then process the event's payload or other data in order to provide the data to downstream computing services, such as data storages where the processed event payload or data may be accessed and retrieved, applications where the data may be viewed or consumed, and the like.

In this regard, the event is published, at a publish operation 210, with a current processing time in original queue 202 for processing. Publishing of the event may allow for the event's payload or other data to be processed for storage and/or use by downstream computing services. Events may therefore have a corresponding event message, such as a message that is streamed for processing and includes at least an event or message ID, such as a universally unique ID or the like that is unique to the message, and an event payload or other transmitted data that is the content of the event and to be processed and/or stored for use. Success of processing and/or storage of the event may be determined at a success check 212. If successful, an event completion operation 214 may be performed where no exception from the new event handler is created or propagated and new event handler workflow 204 may end.

If processing of the event is unsuccessful, a record in an event metadata cache for the event is created at a create record operation 216. This may be done by an event failure tracker, which may correspond to a daemon or other software application and/or process to detect the unsuccessful processing of the event and begin a process to track retries of processing of the event through completion. Creation of the record may include writing the event ID to a table in a database for the event metadata cache or other data storage structure used to track and monitor event processing failures. As such, create record operation 216 may include performing a handshake, by the event failure tracker, with the corresponding database and/or data storage system, which may allow the event failure tracker to write to the database and/or cache (e.g., for the event ID's record), as well as perform lookup and updates for the event and corresponding ID. The database may correspond to a key-value database or store, where keys may correspond to event IDs and values may correspond to timestamps, event retry success, and the like.

Successful creation of the record for the event is checked at a success check 218, where, if successful, a counter increase operation 220 is invoked by new event handler workflow 204. At counter increase operation 220, in response to a successful creation of the event, a time bucket-based counter is incrementally increased, such as by 1 or other set value. This may therefore cause the counter to increase by an amount corresponding to the failure to process the event and record that there is a failed event that requires a retry of processing. A success check 222 is performed, where, if the counter increase was successful, an exception propagation operation 224 may be used to propagate an exception for the failure to process the event. An exception caching operation 226 may cache the exception, which may then allow tries of the event to be attempted to complete the event's processing and/or storage after publishing.

However, creation of the event and/or incrementally increasing the counter may also not be successful, which may require additional operations prior to retrying processing of the event. For example, if a record for the event and/or event ID is not created at create record operation 216, a database exception may be created and the exception cached at exception caching operation 226. Further, if the counter is not incrementally increased at counter increase operation 220, the record for the event may be deleted at a record deletion event 230, and a propagate exception event 234 may be used to propagate an exception of the event. This exception is then further cache at exception caching operation 226.

In this regard, exceptions may be created due to a timeout or other intermittent issues from the underlying cache/datastore while updating failure tracking metadata. These exceptions may then be classified, such as retryable or non-retryable exceptions, and propagated back to the handler so that event processing and failure tracking is not out of synchronization. On the other hand, updating time bucketed failure counters may be concurrent such that failures from multiple parallel processes trying to update the same time bucket counter may occur. Thus, to maintain an accurate counter, it may be required and implemented that the version of the counter record read and updated remains same in context of a single consumer process. If not, it would mean that some other process may have already updated the counter and the next update should be on top of the updated value, rather than overriding the already updated value. To distinguish such scenarios, a record version conflict exception (e.g., a retryable exception) is provided to the handler and then the handler may signal that the event needs to be redelivered and reprocessed.

Based on the cached exceptions, at event publishing operation 238, the event is published to, republished in, and/or retried by another second processing queue, such as a retry queue shown in FIG. 2B. When performing event publishing operation 238, a new or copied and modified event message for the message may be provided to the second queue, such as the same or similar event message having the event ID and payload for processing. The message may instead though include additional headers that may include updated or changed headers for the second queue. By using the same event ID, retry success of processing of the event may be tracked when retried instead of having a new message ID (e.g., event ID for the event's message) created when the event is retried.

Referring now to FIG. 2B, in system environment 200b, a retry queue 232 may correspond to an event processing queue used to process events after an initial failure to process the events in original queue 202, where retry queue 232 may correspond to another one of processing queues 136 when processing retries of failures of events 132 from real-time event streamers 131 discussed in reference to system 100 of FIG. 1. In this regard, event data 203 may be provided, as well as retry data 205 that may include event messages that have been published and/or republished for processing in retry queue 232, such as by having event messages 133 modified with corresponding headers for retry queue 232 while retaining IDs 134 and/or payloads 135.

Consume event operation 206 may be invoked again to process events, now using a retry event handler executing a retry event handler workflow 234. In this regard, for the retry event handler, an invoked handler operation 236 may be executed to invoke the retry event handler. The retry event handler may differ where retry event handler workflow 234 may perform a cache lookup operation 238, such as by using the established handshake, with the database for event messages and IDs from the event metadata cache. A record detection operation 240 may then determine if the record is present and the message may be looked up and identified from the cache. If present, a similar process where a publish operation 242 may publish the event with the publishing time for processing and/or storage. A success check 244 may then determine if retrying of processing of the event after publishing is successful, such as whether the event is properly processed and/or stored after publishing from retry queue 232.

If successful, a remove record operation 246 may remove the record of the event from the event metadata cache that includes records for event IDs and the like that failed to process from original queue 202. A removal check 248 may be performed, and if successful, a counter decrease operation 250 is performed where a time bucket-based counter is decreased by the set amount, thereby designating that the event that failed to process when published from original queue 202 has now been successfully completed. After performing counter decrease operation 250, the time bucket-based counter may then be decreased or lowered by 1 or other set value so that the counter no longer tracks the failure to process that event. A success check 252 is performed, and if successful, a retry queue event completion operation 254 may be performed to end retry event handler workflow 234 for processing of the event that has been retried.

However, ID presence, success, and/or removal checks may return a failure, which may cause retry event handler workflow 234 to create exceptions that are then handled further and/or retried. For example, if no message, ID, and/or record is detected by record detection operation 240, new event handler workflow 204 may be invoked and performed for the event and the event may be handled as described with regard to FIG. 2A. An exception check 256 may be performed, and if no exception, retry queue event completion operation 254 may similarly complete and the event is processed. If success check 244 is unsuccessful or fails, retry event handler workflow 234 may proceed to an exception propagation operation 258 where an exception may be propagated based on the failure to process and/or store the event when published. This exception may further designate the event as requiring a retry or further handling after failure to process and/or store.

Exceptions from exception check 256 and/or exception propagation operation 258 may proceed to an exception classification operation 260, where the exceptions are classified as retriable or non-retriable for further retries and/or publishing/republishing for handling and processing. If the record for the event in the event metadata cache is not detected as removed during removal check 248, a database exception 262 may be propagated and provided for classification at exception classification operation 260. Success check 252 may also result in an unsuccessful check, where retry event handler workflow 234 may proceed to a record recreation 264 where the record may be recreated for the data table in the cache so that the record may be processed with an exception. If detected as created during a creation check 266, a condition violation exception may be propagated at exception propagation operation 268, which may proceed to exception classification operation 260. However, if the record is not recreated successfully, a database exception 270 may be created and similarly proceed to exception classification operation 260 for classification. Results from exception classification operation 260 may then be processed and retry event handler workflow 234 may end.

Figure 3:
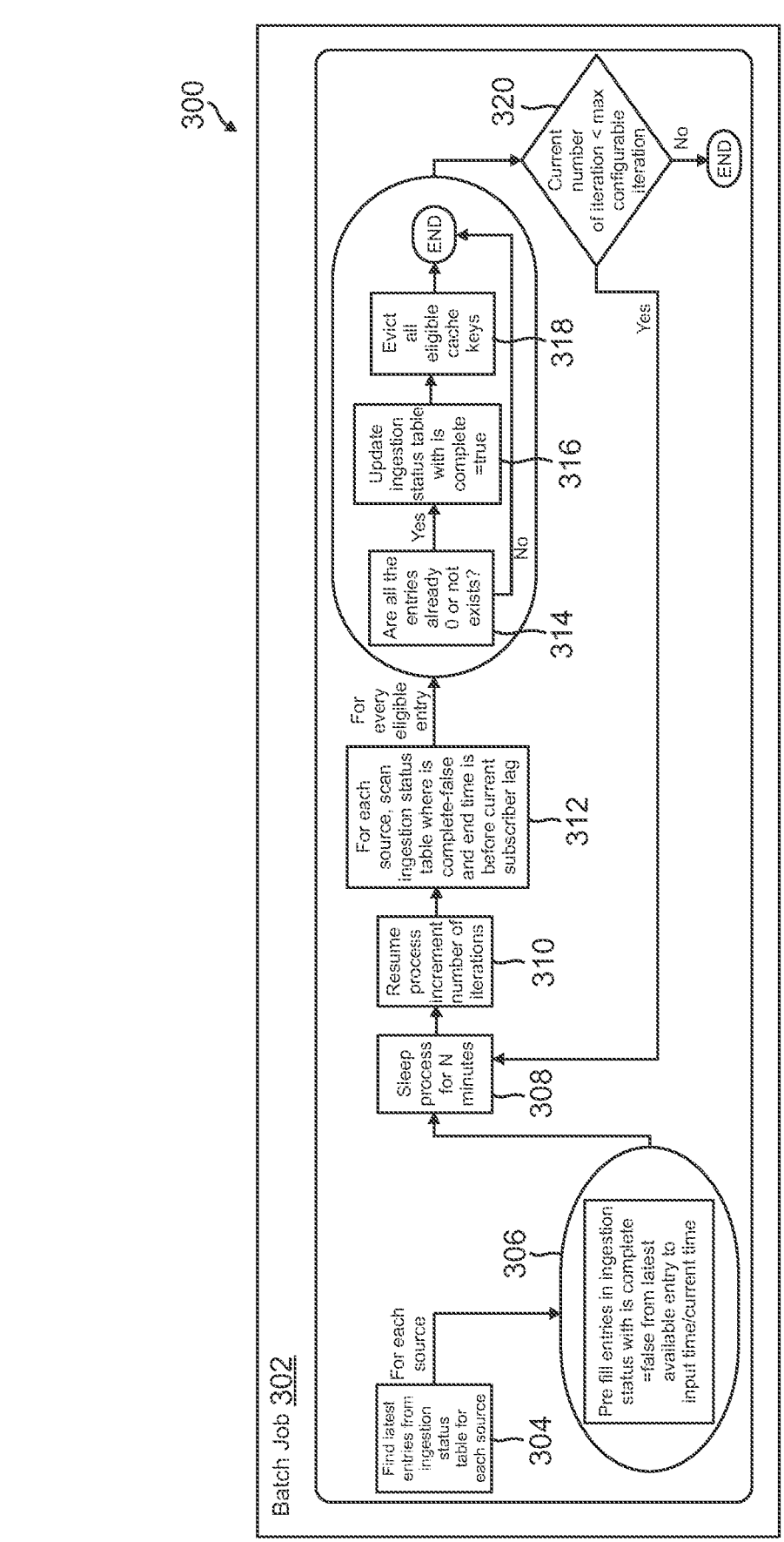
FIG. 3 is an exemplary diagram of a batch job executed to update and maintain a data tables for tracking of failures to process streamed data for events using an event failure tracker and an incremental counter, according to an embodiment.

FIG. 3 is an exemplary diagram 300 of a batch job 302 executed to update and maintain a data table for tracking of failures to process streamed data for events using an event failure tracker and an incremental counter, according to an embodiment. Batch job 302 depicted in FIG. 3 monitors, checks, parses, and otherwise determines all (or a portion of) events being processed by processing queues of an event processing system, such as event processing application 130 of service provider server 120 discussed in reference to system 100 of FIG. 1. As such, batch job 302 may correspond to a processing job for entries in an ingestion status table of event ingestion statuses, such as failures of events to process, that may be performed in a batch based on entries in a table of key-value store 125, as discussed in reference to system 100 of FIG. 1.

For example, batch job 302 may be run every hour or other time interval to scan entries in a table that includes ingestion statuses (e.g., failed, retried, completed, etc.) for event processing of events that include at least those events that failed to process, but may also include those that are pending processing such as when being ingested for storage in another database, cloud storage, or the like. As such, batch job 302 may be used to update the table with event processing statuses and/or determine incremental increases or decreases to a counter for event processing failures and when that counter reaches zero or an initial value again. This thereby indicates that all failed events have been processed, and resulting data for downstream services, clients, applications, and/or databases has been processed and is complete for consumption. Thus, in an initial step, a find entry operation 304 is performed for batch job 302 where the latest entries are found such that the table is read to identify those IDs and/or events that are to be ingested (e.g., in a processing queue, such as original queue 202 and/or retry queue 234). This allows for identification of those events requiring ingestion and processing.

At a prefill operation 306, entries in the ingestion table are then prefilled with an "is complete=false" status so that each event is designated for ingestion and processing. This may be performed for each source of data, such as real-time event streamers 131 or another database, data lake, or the like having events for processing. This may be done for the latest entries until the current time so that new IDs and events added to the table for event messages and/or payloads for processing are identified as being incomplete and not processed. At a wait operation 308, batch job 302 is then slept, paused, or caused to wait for N minutes, where N may be configurable based on how often status updates are checked.

At a resume operation 310, the process is resumed and the number of iterations that have been run for batch job 302 are incrementally increased so that another iteration is designated as completed (e.g., for identifying when a maximum number of iterations have been reached). At a scan operation 312, for each source of events and/or data, the ingestion status table is scanned for indications of an "is complete=false" status. For those that are eligible and not completed, one or more processes to monitor, check, or otherwise determine if such events have been successfully processed and are complete.

As such, batch job 302 may be used to determine if an ingestion status table is complete or still has event entries pending resolution and processing for event data. If all events have a "is complete=true" status, then the events may be considered processed and completed. However, with remaining entries of "is complete=false" statuses, the events may be considered unresolved and the corresponding data unreliable until resolution and/or timeout of event processing (after which, other actions may be taken to resolve pending events). At entry review operation 314, it is determined whether, for each entry, is the value already zero or does it not exist (e.g., been wiped or cleared from the table)? If no, then the current iteration of batch job 302 ends until a further iteration as there are pending entries for completion. This causes batch job 302 to proceed to an iteration check 320 where it is determined whether the current number of iterations is less than the maximum number of iterations. If no, then batch job 302 ends, however, if yes, then batch job 302 returns to wait operation 308.

Although batch job 302 is shown as a single job in FIG. 3 (e.g., for simplicity and cohesion of the operations of such a job), batch job 302 may entail two or more individual jobs and/or executed operations for processing tasks and failure tracking for data ingestion. In such embodiments, the first batch job may pre-fill ingestion status entries ahead of time and create entries with a configurable duration based on how frequently the downstream batch process may scan the data for ingestion. These entries may be created in any datastore depending on the convenience of downstream data consumers (e.g., services consuming and using, storing, or processing the data) that read the raw event data and require data completeness. The second batch job may periodically update ingestion status entries based on failure tracking information from the cache/datastore. That is, the second batch job may scan through all "is_complete=false" records from the ingestion status table in the cache or other data storage, and then for each record checks eligible time bucketed failure counters in the corresponding cached/stored records to check if all are zero or any non-zero (and therefore failure tracked event processing) counter exist. The second batch process may then mark the entries in ingestion status table as "is_complete=true" if zero. Time buckets maintained in the cache/datastore may be a more granular duration than the duration defined in the ingestion status table, so, to determine completeness of each entry, batch job 302 (and the second batch job specifically) may scan for multiple time bucketed entries from cache/datastore.

If at entry review operation 314, it is determined that all of the entries already are zero (e.g., complete) or do not exist (e.g., removed or erased), then batch job 302 proceeds to update operation 316, where the ingestion statuses in the table are updated to "is complete=true", which identifies those entries as being completed. This identifies those entries that have been completed as such in the table. Batch job 302 then proceeds to an evict operation 318, where all eligible IDs or other keys for data records and/or values are evicted from the key-value database. This clears the records for the events that have been processed and frees storage room in the key-value store or other database for use with further event processing and/or tracking of event processing failures. Thereafter, batch job 302 ends the current iteration and, in a similar manner to previously discussed, proceeds to iteration check 320, where batch job 302 ends or continues, as discussed above.

Figure 4:
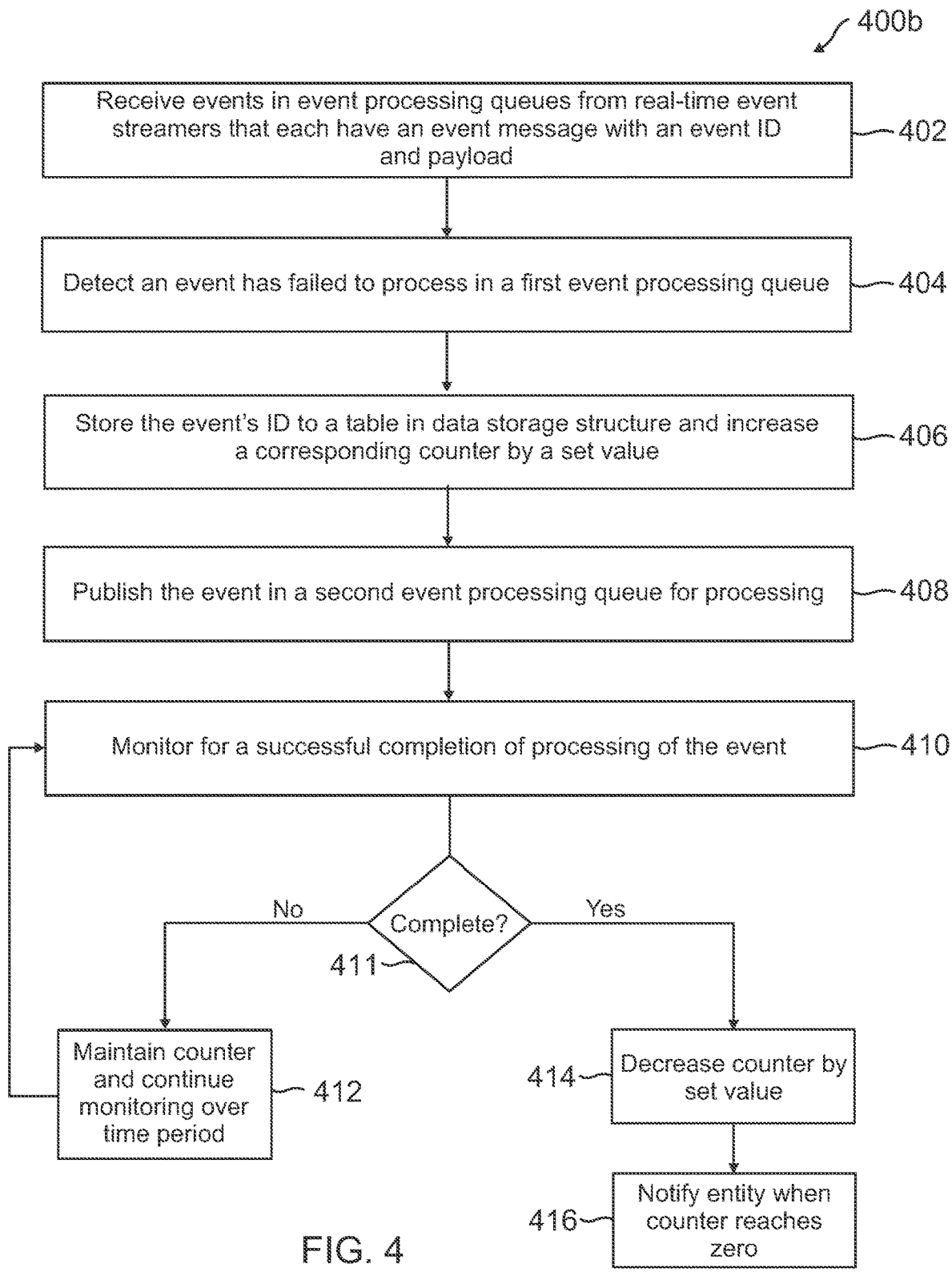
FIG. 4 is a flowchart of an exemplary process for failure tracking with real-time data event streaming for data quality checks, according to an embodiment.

FIG. 4 is a flowchart 400 of an exemplary process for failure tracking with real-time data event streaming for data quality checks, according to an embodiment. Note that one or more steps, processes, and methods described herein of flowchart 400 may be omitted, performed in a different sequence, or combined as desired or appropriate.

Flowchart 400 in FIG. 4 includes steps executed by service provider server 120 with user device 110, such as using event processing application 130 when tracking event processing failures and retries using event failure tracker 137. As such, different portions of the steps of flowchart 400 are shown as being performed by, on, or with event failure tracker 137 when providing data to user device 110. At step 402 of flowchart 400, events in event processing queues are received from real-time event streamers that each have an event message with an event ID and payload. In this regard, events 132 may be streamed by real-time event streams 131 to processing queues 136 for processing, where events 132 may be associated with event messages 133 having data for processing and/or identification of the events. Event messages 133 may include IDs 134 and payloads 135. One of processing queues 136 may correspond to original queue 202, which may receive event data 203 as input for processing of events 136. As such, the events received in the event processing queues may be streamed in real-time from incoming events and data to be processed. However, in other embodiments, the data need not be real-time streaming data, and may be data tables, data loads, and/or databases that may be processed, such as when converting data from one storage medium, service, or system to another.

At step 404, an event is detected that has failed to process in a first event processing queue. For example, when one of events 136 is being processed in original queue 202, new event handler workflow 204 may proceed to detect a failure to process, store, and/or publish the data for the event for downstream applications, endpoints, and/or services. This creates an issue where processing of all events is incomplete and therefore the data being served downstream is not one hundred percent complete and/or reliable. As such, event failure tracker 137 is used to track failures of events to process and then initiate a process to track such failure until successful completion of a retry occurs in another one of processing queues 136, such as retry queue 234.

At step 406, the event's ID is stored to a table in a data storage structure, and a corresponding counter is increased by a set value. Event failure tracker 137 may detect the failure to process one of events 132 and may determine one of IDs 134 for the corresponding event. This ID may correspond to a message or event ID, and may be used to track the failed event through failure and retry in a subsequent processing queue. As such, the ID may follow a corresponding one of event messages 133 or payloads 135 through processing by retry queue 234. As such, storing the ID to a table or other data structure in a corresponding data storage, such as a cache, database, or the like, may allow for tracking of a status of event processing.

The ID may be stored in a storage structure, such as in database 124 including key-value store 125, having a table with rows for failed events to process tracked using their ID with at least a column designating a status of processing completion (e.g., processing retry status). Further columns may be associated with timestamps for event receipt, failure, last status check, completion, and the like, as well as payload identification or hashes and the like. Storage of the ID in the table may be done through a handshake that establishes a permission and/or channel to perform database lookups and table scans or reads to check for the ID in the table and the status, as well as write to the table. Writing to the table may be permitted to write the ID and failure status, as well as update that status and/or timestamps when retries are attempted and/or successful. Further, counter 126 may be maintained with the table in the data storage structure, and may be incrementally increased by a set value, such as one, for each failed event. Counter value 127 may therefore reflect a number of failed events and may be adjusted as events fail and/or and successfully retried.

At step 408, the event is published in a second event processing queue for processing. Publishing may correspond to republishing, such as by transmitting a redelivery of one of event messages 133 with different headers but the same one of IDs 134 and payloads 135 in a different one of processing queues 136 for event processing retries. As such, at least the corresponding one of IDs 134 and payloads 135 is republished, published again, or otherwise provided to retry queue 234 for retry and processing, such as by providing retry data 232 that is redelivered to consume event process 206. In other embodiments, a new message may be generated instead of adjusting the previous one of event messages 133 with new headers and the new message is processed.

At step 410, a successful completion of processing of the event is monitored for, which indicates that the event has been processed in a retry queue and/or successfully completed. In this regard, event failure tracker 137 may monitor outputs of at least retry queue 234, as well as other ones of processing queues 136, to identify those event that are processed and completed, and may perform a lookup of the ID in the data storage structure to determine whether the ID is written for a failed event and the current status. Monitoring may occur at periodic intervals and/or over a time period over which the data may be designated as unreliable and a status shown as requiring retry and completion of failed event processing.

At step 411, a determination is made whether the event is detected as completed. If the event is not detected as completed, the counter is maintained, and monitoring continues for a time period at step 412. As such, counter 126 may not be adjusted and counter value 127 may be maintained at the same value. However, is the event is detected as completed at step 411, the counter is decreased by the set value, at step 414. For example, an output of retry queue 234 may indicate that one of event 132 that failed has been retried and processed. The corresponding one of IDs 134 may then be used to perform a database lookup, and the table record for the event failure may be identified. This may allow for writing a completion status update to the table for the ID, and counter 126 may be decreased by the same increment by which it was increased for the failure. As such, counter value 127 may be decreased by the set value, such as 1.

Thereafter, at step 416, the entity is notified when the counter reaches zero. For example, when counter value 127 for counter reaches an initial value or zero again after all event processing failures are retried, resolved, and completed, the corresponding data records or the like associated with the events may be reliably reported and utilized by downstream services. As such, a downstream service, including applications, devices, services, and the like may be notified that the data requested that is associated with the events in now reliable in that all events have been processed. For example, a merchant may then view a balance that reflects all transaction events as being processed and therefore the merchant or other systems and applications (including risk decisioning, underwriting, or the like) may rely on such data without further events that have failed and are later processed affecting the data.

Figure 5:
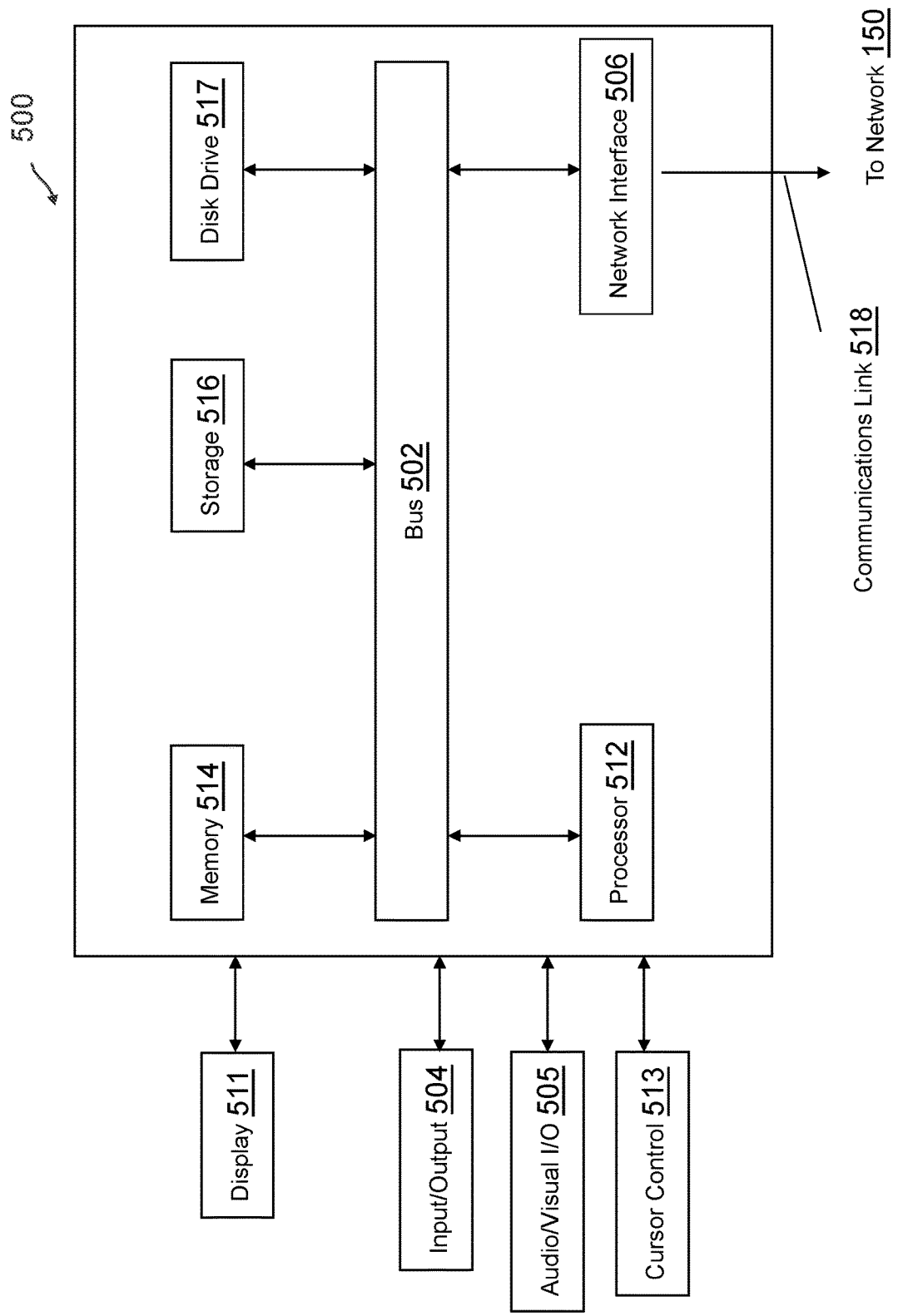
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.)

capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   detecting, by an event failure tracker of an event processing application, a failure by event processing application to process an event in a first processing queue, wherein the event is associated with an event message having an event identifier (ID) and an event payload, wherein the event payload includes transmitted data processable for use by a downstream computing service, wherein the event failure tracker comprises a software daemon executable with a new event handler for a data streamer of the event processing application, and wherein the new event handler manages processing of the event in the first processing queue and a retry event handler manages processing of the event in a second processing queue;
   based on the failure, storing, by the event failure tracker, the event ID in a failed event data storage structure of a key-value database;
   increasing, by the event failure tracker, a counter based on the failure to process the event;

republishing, for the event by the event failure tracker, at least the event ID and the event payload in the second processing queue for processing of the event;
monitoring, by the event failure tracker, for a successful completion of processing the event from the second processing queue using the event ID from the failed event data storage structure; and
determining, by the event failure tracker, whether to update the counter in the failed event data storage structure based on the monitoring.

2. The system of claim 1, wherein the increasing the counter comprises increasing a preexisting count value of the counter by a set value corresponding to the failure to process the event in the first processing queue, wherein the set value is established for a plurality of failures to process different events in the event processing application, and wherein updating the counter responsive to the successful completion of processing the event comprises decreasing the counter by the set value based on the successful completion.

3. The system of claim 1, wherein the storing the event ID in the failed event data storage structure comprises:
creating a record for the event in the failed event data storage structure using the event ID and a handshake between the event failure tracker and the key-value database for database lookups; and
updating, via the event failure tracker, the failed event data storage structure on each failure and each successful retry of failed events including the event based on the record and the handshake.

4. The system of claim 3, wherein the operations further comprise:
determining, by the event failure tracker, all of the failed events have been successfully retried;
determining that a state of data provided to a customer entity of the system requires a rollback after the failed events have been successfully retried; and
transmitting a notification to the customer entity of the state requiring the rollback.

5. The system of claim 4, wherein the customer entity comprises a merchant and the state comprises a merchant balance of the merchant, and wherein the data corresponds to downstream data provided at one or more of the downstream computing services utilized by the merchant.

6. The system of claim 1, wherein the republishing comprises:
changing message headers in the event message for the second processing queue, wherein the event payload and the event ID remain the same for the event message between the first processing queue and the second processing queue; and
transferring the event message having the changed message headers to the second processing queue.

7. The system of claim 1, wherein the republishing includes retrying the event message in the second processing queue after the failure in the first processing queue to process the event.

8. The system of claim 1, wherein the monitoring comprises:
accessing, by the event failure tracker, the event ID from the failed event data storage structure using a call to the key-value database;
performing, by the event failure tracker, a lookup of a status of the event ID in a data table associated with ingestion statuses of events in the second processing queue; and
determining, by the event failure tracker, whether the status indicates the successful completion,
wherein the system monitors each of the events in the second processing queue until the counter reaches zero or an initial state prior to any event failures associated with at least one of a time frame, a merchant, a set of transactions, or a designated stream of transactions.

9. A method comprising:
receiving, by an event processing application, an event in a first processing queue of a first event handler for the event processing application, wherein the event is associated with an event message having an event identifier (ID) and an event payload for processing, wherein the event payload is associated with event data handled by the event processing application for downstream computing services;
processing, by the first event handler, the event payload for the event based on the first processing queue;
determining, by an event failure tracker of an event processing application, that the processing of the event payload has failed;
storing the event ID in a failed event data storage structure of a key-value database by the event failure tracker based on the determining, wherein the storing includes performing, by the event failure tracker, a handshake with the key-value database, and wherein the handshake enables the event failure tracker to write to the key-value database in association with a table including the event ID;
increasing a counter of the event failure tracker by a set value corresponding to the event failing to be processed in the first processing queue;
adding, for the event, at least the event ID and the event payload to a second processing queue for a second event handler of the event processing application;
processing, by the second event handler, the event payload for the event based on the second processing queue;
determining, by the event failure tracker, whether the processing is successful; and
decreasing, by the event failure tracker, the counter by the set value when the processing the event payload by the second event handler is successful.

10. The method of claim 9, further comprising:
determining that the counter has reached a value indicating all of a set of failed events tracked by the event failure tracker are completed after retrying in at least the second processing queue; and
identifying that all of the set of failed events are completed for an event stream utilized by one or more of the downstream computing services.

11. The method of claim 10, further comprising:
updating an event processing status with the one or more of the downstream computing services that all of the set of failed events are completed after retrying.

12. The method of claim 10, further comprising:
providing a status indicating a reliability of data from the event stream to a merchant based on the identifying.

13. The method of claim 9, further comprising:
receiving a request for data associated with the processing of the event at one of the downstream computing services;
determining a state of the data to be provided to the one of the downstream computing services based on the counter; and
updating the one of the downstream computing services with the state.

14. The method of claim 13, wherein the state indicates whether any events required for the data by the one of the downstream computing services has failed to be processed.

15. The method of claim 9, wherein the adding comprises retrying the processing of the event in the second processing queue with other failed events in accordance with a retry queue where the other failed events are retried.

16. The method of claim 15, wherein the retrying includes republished the event message with the event ID and the event payload but different message headers.

17. A non-transitory machine-readable medium having stored thereon machine-readable instructions executable to cause a machine to perform operations comprising:
- detecting a failure by an event processing application of a processing of an event in a first processing queue, wherein the event is associated with an event message having an event identifier (ID) and an event payload, wherein the event payload includes transmitted data processable for use by downstream computing services;
- based on the failure, storing the event ID in a data storage structure;
- increasing a counter based on the failure of the processing of the event;
- retrying the processing of the event in a second processing queue;
- monitoring for a successful completion of the processing the event from the second processing queue using the event ID from the failed event data storage structure;
- determining, based on a value of the counter, that all events in a set of failed events have been completed after retrying each event in the set of failed events, wherein the set of failed events are utilized by one or more of the downstream computing services and include the event, and wherein the successful completion of the event is identified by at least the value of the counter; and
- updating an event processing status with the one or more of the downstream computing services of the successful completion of the processing of the event after the failure based on the retrying the processing of the event.

18. The non-transitory machine-readable medium of claim 17, wherein the operations further comprise:
- determining that the successful completion of the event has occurred based on an output of the second processing queue and the event ID;
- decreasing the counter based on the successful completion; and
- determining whether to notify an entity of a completion of processing of failed events including the event based on a current value of the counter.

* * * * *